Nov. 13, 1934.    W. B. STOUT    1,980,233
AIRPLANE
Filed April 20, 1932

INVENTOR
William B. Stout.
BY
Harness, Dickey, Pierce + Hann
ATTORNEYS

Patented Nov. 13, 1934

1,980,233

UNITED STATES PATENT OFFICE 1,980,233

AIRPLANE

William B. Stout, Detroit, Mich.

Application April 20, 1932, Serial No. 606,316

3 Claims. (Cl. 244—31)

This invention relates to airplanes and has for its principal object to increase the efficiency of operation of the airplane and the motor means therefor.

Another object is to provide means for drawing air from the upper surface of an airplane wing for increasing the lift of the wing during those phases of flight in which air eddies occur and for maintaining the lift of the wing when eddies are liable to occur above the wing.

Another object is to provide means for utilizing air withdrawn from the upper surface of the airplane wing for useful purposes, such as for cooling the airplane motor.

Another object is to provide a novel arrangement of motor and cooling system therefor so disposed as to offer the minimum parasitic resistance to an airplane in flight.

Another object of the invention is to provide a cooling arrangement for an airplane motor disposed within the wing of the airplane by which arrangement air is efficiently conducted to each cylinder of the motor.

Other objects and advantages will become apparent from the following description and appended claims.

In the accompanying drawing which shows a suitable embodiment of the present invention, and in which like numerals refer to like parts throughout the several different views.

It is well known in the airplane art that excessive inclination of the wing, which occurs particularly at low or decreasing speeds, causes or is liable to cause air eddies on the top surface of the wing which eddies decrease the lifting ability of the wing very abruptly and tend to throw the plane into a stall.

Considerable work has been done in recent years in an effort to eliminate the presence of such eddies. One of the most common remedies being provision of so called "wing slots", which transfer air from a point on the lower surface and usually adjacent the leading edge of the wing, to the upper surface of the wing in the neighborhood of the point where such eddies occur so as to prevent a break in the smooth flow of the air over the upper surface.

Another method of preventing the occurrence of these eddies may be effected by withdrawing air from the so-called boundary layer adjacent the upper surface of the wing, the suction being applied through the medium of a power driven suction blower.

The present invention involves the application of the latter method for eliminating these eddies, but in such a manner as to utilize the air withdrawn from the slot in the upper surface of the wing for purposes of modifying the operation or condition of the airplane engine or parts thereof.

Figure 1:
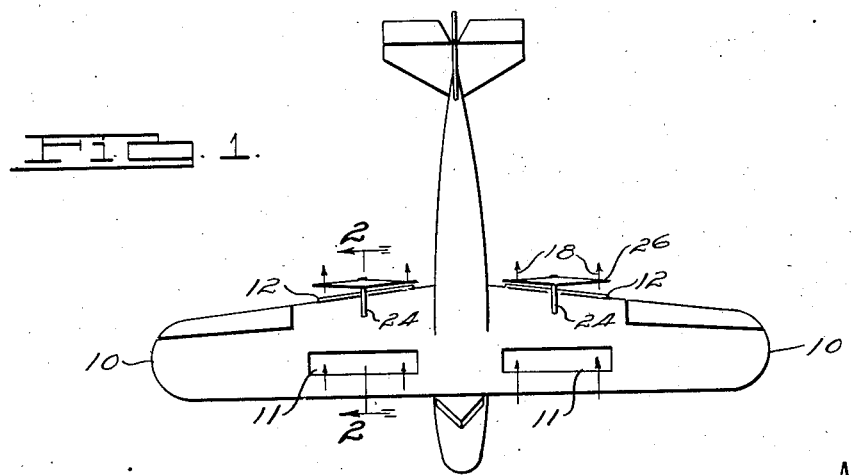
Fig. 1 is a top plan of an airplane constructed in accordance with this invention.
Figure 2:
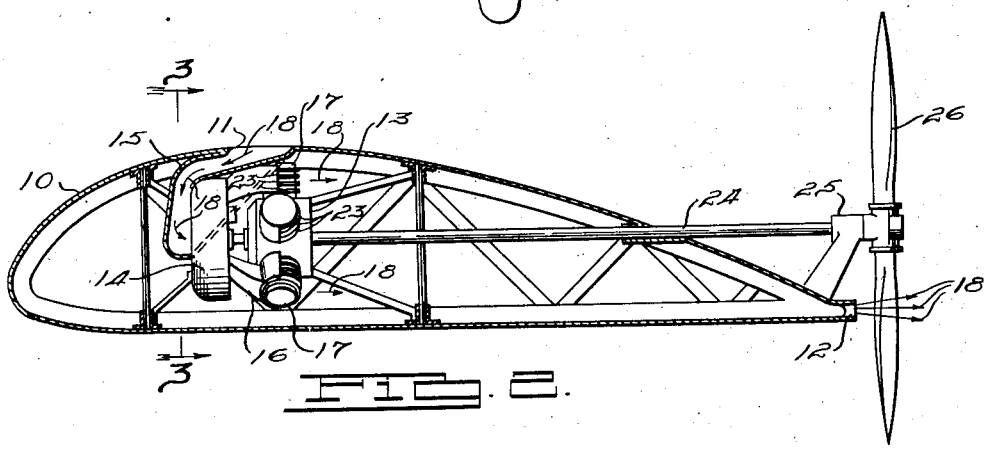
Fig. 2 is an enlarged section taken on the line 2—2 of Fig. 1.
Figure 3:
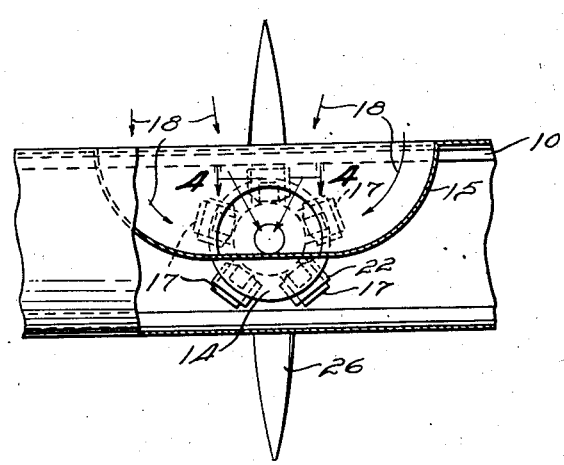
Fig. 3 is a section taken on the line 3—3 of Fig. 2.
Figure 4:
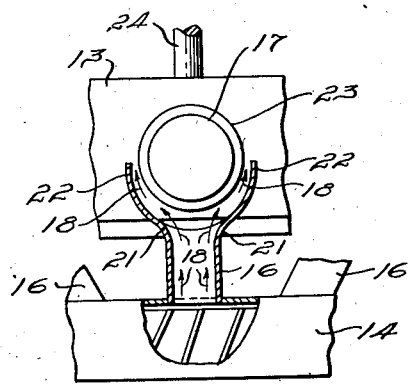
Fig. 4 is a fragmentary detail in top plan, on a more enlarged scale and with parts broken away, to show a section on line 4—4 of Fig. 3.

Referring to the accompanying drawing, I have illustrated in Figs. 1 and 2, an airplane having wings 10 provided with elongated slots 11 in their upper surfaces and exhaust ports 12 in the trailing edge portions thereof. Although the slots 11 are shown as extending through but a portion of the top surfaces of the wings 10, it is noted that these slots may extend throughout the length of the wings or any desired portions thereof. Within each wing 10 I mount an engine 13 and a blower operatively connected thereto for constant operation therefrom, these devices being suitably secured to and supported by the frame work for such wings. Each blower 14 is preferably disposed between the engine 13 and opening 11. A conduit 15 connects the opening 11 with the suction side of blower 14 and conduits 16 communicate between the outlet side of the blower and cylinders 17 of engine 13. The course of the air as it is directed through the wings is indicated by means of arrows 18. The walls of conduits 16 diverge toward the cylinders 17 and the mouths thereof, indicated at 21 in Fig. 4, flare outwardly to a still greater extent. Baffles 22 are connected to the conduits 16 and extend partially around the cylinders 17 to guide the air uniformly to the cooling fins 23 formed on the walls of cylinder 17.

In the embodiment illustrated, the crankshaft 24 of engine 13 is extended directly rearwardly through the wing 10 and through a bearing 25, as shown in Fig. 2. The end of shaft 24 carries a propeller 26 in such a position that an intermediate portion of the blades of the propeller serves to aid in exhausting air through the exhaust port 12 located in the tail portion of each wing 10. Propellers 26 may, however, be mounted in other locations relative to the wings and the drive shafts therefor operatively connected to the engines by other desired means.

In the operation of the cooling devices each blower 14 withdraws the boundary layer of air from the upper surface at a point adjacent the top of the wing 10 and directs the air through the conduit 15, and then forces this air through the individual conduits 16, to each cylinder 17, and thence to the exhaust ports 12. Thus each cylinder receives air through its individual conduit and equal amounts of air are supplied for uniformly cooling all the cylinders of the airplane engine. Other conduits may lead from the exhaust side of the blower to other parts of the engine for supplying air for any desired purpose.

By disposing the engines and the cooling means therefor within the wings parasitic resistance offered by these parts to the airplane in flight is reduced to a minimum, since only a portion of the shafts 24 and bearings 25 therefor projects outside the wings 10.

As many changes could be made in the above described arrangement, and many apparently widely different embodiments of this invention could be made without departing from the scope thereof, it is intended that all matter contained in the above description as shown in the accompanying drawing shall be interpreted as illustrative and not in the limiting sense.

I claim:

1. In an airplane, in combination with a wing thereof having an opening in its upper surface, a multi-cylinder engine disposed within the wing, a blower disposed within the wing and operatively connected to said engine so as to be driven thereby, a conduit communicating between said opening and the suction side of said blower, a plurality of conduits each communicating between the outlet side of said blower and a cylinder of said engine.

2. An airplane, in combination with a wing thereof, having an opening in its upper surface, a multi-cylinder engine disposed within the wing, a blower disposed within the wing and operatively connected to said engine so as to be driven thereby, a conduit communicating between said opening and the suction side of said blower, a plurality of conduits, each communicating between the outlet side of said blower and a cylinder of said engine and each increasing in cross-section from the blower to the cylinder, and baffles connected to each of the plurality of conduits and extending practically around one of said cylinders.

3. In an airplane, in combination with a wing thereof, provided with an opening in its upper surface, an engine disposed within the wing, means operatively connected to said engine so as to be driven thereby and disposed within the wing for drawing air through said opening and directing the air to said engine for controlling its operation, said wing being provided with a port in the tail portion thereof, a propeller disposed in rear of said tail portion so that an intermediate portion of the blades of the propeller will aid in exhausting air through said port and means for operatively connecting said propeller to said engine.

WILLIAM B. STOUT.